United States Patent
Gasquet et al.

(10) Patent No.: US 6,382,881 B1
(45) Date of Patent: May 7, 2002

(54) PROCESS FOR CONVEYANCE OF POWDER MATERIALS IN A HYPERDENSE BED AND POTENTIAL FLUIDIZATION DEVICE FOR EMBODIMENT OF THIS PROCESS

(75) Inventors: Gerard Gasquet, Les Pennes Mirabeau; Christian Cloue, Gardanne, both of (FR)

(73) Assignee: Aluminium Pechiney, Paris Cedex (FR)

( * ) Notice: Subject to any disclaimer, the term of this patent is extended or adjusted under 35 U.S.C. 154(b) by 0 days.

(21) Appl. No.: 09/646,122
(22) PCT Filed: May 6, 1999
(86) PCT No.: PCT/FR99/01075
  § 371 Date: Oct. 27, 2000
  § 102(e) Date: Oct. 27, 2000
(87) PCT Pub. No.: WO99/58435
  PCT Pub. Date: Nov. 18, 1999

(30) Foreign Application Priority Data

May 11, 1998 (FR) .............................. 98 06124

(51) Int. Cl.[7] .............................................. B65G 53/00
(52) U.S. Cl. .................... 406/197; 406/198; 406/14; 406/19
(58) Field of Search ...................... 406/14, 19, 197, 406/198

(56) References Cited

U.S. PATENT DOCUMENTS

| 3,056,632 | A | | 10/1962 | Isler |
| 4,016,053 | A | | 4/1977 | Stankovich |
| 4,279,549 | A | * | 7/1981 | Hanrot et al. ................. 406/14 |
| 4,450,053 | A | | 5/1984 | Merz |
| 4,747,732 | A | | 5/1988 | Hanrot |

FOREIGN PATENT DOCUMENTS

| DE | 3024567 | | 1/1982 | |
| EP | 0 187 730 A2 | * | 7/1986 | ............. B03B/4/00 |

\* cited by examiner

Primary Examiner—Christopher P. Ellis
Assistant Examiner—Joe Dillon, Jr.
(74) Attorney, Agent, or Firm—Dennison, Scheiner & Schultz

(57) ABSTRACT

Process for conveyance of a powder material (12) in a potential fluidization hyperdense bed using a device comprising at least one air pipe (3) comprising a lower duct (5) for circulation of a fluidization gas (G), an upper duct (7) for circulation of the powder material (12), the two ducts being separated by a porous wall (6), at least one pipe (8) supplying gas (G) and a balancing column (4, 4.2) in which the filling height (h) balances the potential fluidization pressure ($p_f$), characterized in that a bubble (B1, B2) of pressurized gas is created in the upper duct (7) in the air pipe (3). This bubble is reliably located in the upper part (14) of the upper duct (7) of the said air pipe (3). Device to implement this process and to regulate the pressure of the gas bubble.

8 Claims, 2 Drawing Sheets

PROCESS FOR CONVEYANCE OF POWDER MATERIALS IN A HYPERDENSE BED AND POTENTIAL FLUIDIZATION DEVICE FOR EMBODIMENT OF THIS PROCESS

BACKGROUND OF THE INVENTION

The invention relates to the conveyance of fluidizable powder materials. It is a horizontal or inclined conveyance capable of transporting the said materials between a storage area and at least one area to be supplied, the said areas being at different locations.

It is a continuous process for conveyance of a powder product in order to feed a large number of packaging assemblies such as bagging machines, containerization devices, or a large number of production assemblies such as plastic extruding presses or igneous electrolysis cells, from a single storage area.

Powder materials to be conveyed can be fluidized; their size grading and cohesion are such that injecting gas into them at low velocity can eliminate cohesion between particles and reduce internal friction forces. For example, this type of material includes alumina for igneous electrolysis, cements, plasters, quick lime or slaked lime, fly ash, calcium fluoride, magnesium chloride, all types of fillers for mixes, catalysts, coal dust, sodium sulfate, phosphates, polyphosphates or pyrophosphates, plastics in powder form, food products such as powder milk, flour, etc.

DESCRIPTION OF RELATED ART

Many devices have been studied and developed for conveyance of powder materials in fluidized bed. One particular problem is related to the continuous feed of the powder material regulated as a function of consumption requirements of the said material. One of the many examples illustrating this problem is feed of alumina to igneous electrolysis cells for the production of aluminum.

In order to do this, the alumina, which is a powder product conveyed and solubilized in the electrolytic bath, is consumed gradually while electrolysis is taking place, and must be replaced as it is consumed so that the concentration of solubilized alumina remains optimum, encouraging maximum efficiency of the electrolysis cell. It then becomes necessary to adjust the quantity of alumina added into the electrolytic pot, so that its operation is not disturbed by excess or insufficient alumina.

The powder materials conveyance device developed by the applicant and described in European patent EP-B-0 179 055 enables continuous feed of powder solids in their hyperdense phase. It is used particularly for regular and continuous feed to storage and distribution hoppers located in the superstructure of electrolysis vats.

It is a potential fluidization device designed for conveyance of powder materials in a hyperdense bed, in order to transport these materials from a storage area to an area which needs to be supplied. As in conventional fluidization, this device comprises at least one horizontal conveyor called the air-pipe between the storage area and the area to be supplied, composed of a lower duct in which gas circulates, and an upper duct in which the powder material is conveyed, the two channels being separated by a porous wall. Gas is blown into the lower duct through at least one supply tube. Unlike what happens in conventional fluidization, the powder material completely fills the upper duct of the conveyor and this conveyor is fitted with at least one balancing column partially filled by powder material, the filling height balancing the gas pressure. This balancing column creates the conditions for potential fluidization of the powder material. The powder material, which is not disturbed very much due to the very low density of the gas, is present in the air pipe in the form of a hyperdense bed.

In order to make the description of potential fluidization easier to understand, it is worth while repeating the principles of conventional fluidization, normally used for conveying powder materials and described for example in patent U.S. Pat. No. 4,016,053. The device used in fluidization also comprises an air pipe as described above. The fluidization gas is injected into the lower duct at a given pressure $p_f$, passes through the said porous wall and then passes between the particles at rest in the powder material forming the layer to be fluidized. Unlike the potential fluidization device described in EP 0 179 055, the thickness of this layer at rest is very much less than the height of the upper duct of the said conveyor, in other words in the absence of any injection of fluidization gas, the powder material only very partially fills the upper duct of the horizontal conveyor.

By imposing a high gas flow, the said particles are moved and lifted, each of them losing its permanent contact points with its neighbors. In this way the interstitial space between the particles increases, internal friction between particles is reduced and these particles are put into a state of dynamic suspension. Consequently, the result is an increase in the initial volume of the powder material and a corresponding reduction in the apparent density, since a suspension of a solid phase in a gaseous phase is formed.

Therefore, the apparent density of the material is lower than the apparent density used in potential fluidization as described in EP 0 179 055, which refers to a hyperdense phase. The term "dense phase" is usually reserved for pneumatic transport at high pressure. The hyperdense phase is characteristic of potential fluidization. To give an idea of the situation, consider the example of the case of alumina $Al_2O_3$ in which the solid/gas ratio is of the order of 10 to 150 kg $Al_2O_3$/kg of air in dense phase pneumatic transport and is 750 to 950 kg $Al_2O_3$/kg of air for conveyance by potential fluidization in the hyperdense phase. Therefore, the solid powder can be conveyed at very high solid/gas concentrations in the hyperdense phase, significantly higher than the dense phase in pneumatic transport.

In the case of potential fluidization, even if no gas is injected, the powder material almost completely fills the conveyance device and particularly the upper duct. When gas is injected into the lower duct, the balancing column is partially filled with powder material occupying the upper duct at a manometric head that balances the pressure $p_f$ and prevents the size of the interstices between the particles from increasing. Consequently, the presence of the balancing column prevents fluidization of the powder material present in the horizontal conveyor and forces the said material to appear as a hyperdense potential fluidization bed. Furthermore, since the interstitial distance between particles does not increase, the permeability of the medium to gas injected at pressure $p_f$ is very low and limits the gas flow to a very small quantity. We will subsequently refer to this low gas flow that passes through the balancing column "degassing".

Thus, with a fluidization pressure $p_f$ equal to 80 millibars, the circulating gas velocity corresponding to the said pressure $p_f$ and causing fluidization of powder alumina is of the order of $33.10^{-3}$ m s$^{-1}$ in the device described in U.S. Pat. No. 4,016, 053, whereas in the potential fluidization device according to EP-B-0 179 055, the circulating gas velocity is only of the order of $4.10^{-3}$ m s$^{-1}$ This velocity is too low to cause fluidization of alumina in the conveyor assembly.

No fluidization takes place, but it is possible to talk about potential fluidization; there is no permanent circulation of material in the air pipe, but flow will take place by successive collapsing as soon as the need for any powder material arises, for example when the level of the area to be supplied drops below a critical value. When continuous consumption of the material stored in the area to be supplied is such that the material level drops below the level of the orifice in the supply pipe, a certain quantity of powder material will escape from the pipe creating a "vacuum" which will be filled by falling material, which will create a domino effect and thus continue throughout the air pipe working backwards towards the storage silo.

The potential fluidization device for conveyance in a hyperdense bed, as described in EP-B-179 055, is used on a large scale particularly to supply 300 000 ampere vats in recent installations designed for igneous electrolysis of aluminum. The advantages of this device are well known:

- continuous feed to vats in order to keep the hoppers full at all times,
- low system maintenance,
- relatively low air pressures necessary for fluidization (0.1 bars compared with 6 bars for dense phase pneumatic transport),
- displacement of alumina at low velocity, limiting equipment wear and attrition and product lumping.

Although it has all the advantages mentioned above, the device described in EP-B-0 179 055 may have some disadvantages if special precautions are not taken:

- unoptimized consumption of fluidization gas, and therefore energy,
- large quantities may be blown off, in other words recycling of alumina, through the balancing columns,
- risk of size segregation by preferred blowing off of the finest particles.

Furthermore in an electrolysis workshop, the number of areas to be supplied from a single storage area is large (several tens) and the distance between the storage area and the area to be supplied may be long (several hundreds of meters) In order to satisfy these constraints, the applicant proposed the device illustrated in EP-B-0 179 055 which consists of a series of conveyors in cascade; a primary conveyor joins the storage area to a series of secondary conveyors, each assigned to one vat and provided with side connections to feed the hoppers built into the vat superstructure. Although these air pipes, and particularly the primary conveyor, are fitted with a large number of balancing columns, under some operating conditions it may be found that:

- operation is unstable with a risk of the air duct getting completely blocked when degassing does not take or takes place incompletely in one of the balancing columns,
- control of the alumina level in the air duct and in the balancing column is uncertain, possibly breaking the supply in extreme cases.

SUMMARY OF THE INVENTION

The process according to the invention is a process for conveyance of powder materials in a hyperdense bed by potential fluidization using a device comprising at least one air duct, comprising a lower duct designed for circulation of a fluidization gas, an upper duct designed for circulation of the powder material, the two ducts being separated by a porous wall, at least one fluidization gas supply pipe and a balancing column, in which the filling height balances the potential fluidization pressure, characterized in that a pressurized gas bubble is created in the upper duct of the air pipe. Preferably, the objective is to create a bubble at all points in the air pipe, except in the upper part of the upper duct adjacent to the balancing columns. Also preferably, an attempt is made to ensure that the said bubble remains in the upper part of the upper duct in the long term.

Another purpose of the invention is a device for creating, checking and regulating the volume and pressure of the fluidization gas bubble maintained in the upper part of the upper duct of the air pipe.

Even if the number of areas to be supplied is large, the process according to the invention can keep all parts of the air pipe between the storage area and the area to be supplied in a state of potential fluidization. This process is characteristic in that the pressure of the bubble created according to the invention in the upper part of the upper duct is servocontrolled such that the height of the powder product in the balancing column adjacent to the bubble is maintained at a predefined set value.

Without the improvement provided by the process according to the invention, it can happen that fluidization gas circulation through the powder product becomes uncertain, the risk being particularly high when the distance between the storage area and the areas to be supplied exceeds a few hundred meters, and when the number of areas to be supplied from a single storage area is large. Even if the air pipes are provided with several balancing columns, it is possible that not all areas are in a potential fluidization situation, which can have catastrophic consequences, particularly when the objective is to provide continuous feed to an igneous electrolysis cell.

The applicant was surprised to find that when the upper part of the air pipe is not full of powder material, the fluidization gas is able to circulate more easily which improves the potential fluidization conditions to be satisfied in all parts of the air pipe. In the process according to the invention, a fluidization gas bubble is created in the upper part of the air pipe, at least in areas not adjacent to the balancing columns, since the powder material must be able to rise freely into the said column. It also creates a "stable" bubble in order to prevent unwanted flows or collapsing of the powder material.

There are thus two distinct phases in the upper duct of the conveyor:

- a fluidized or potential fluidization phase which is a mix of a powder solid and a fluidization gas located in the lower part of the air pipe,
- a distinct phase consisting essentially of the fluidization gas circulating in the upper part of the conveyor. This is the phase that forms the "bubble".

As in conventional fluidization, the upper duct in the air pipe is not completely filled by the powder material to be conveyed, but the big difference between the device used to implement the process according to the invention and a conventional fluidization air pipe is in the fact that the gas bubble above the top level of the powder material remains after pressurization. This pressure is directly related to the height of powder material located in the adjacent balancing column.

One way of creating these bubbles is to insert barriers such as steel flats or other geometric shapes such as a circular or a polygonal penetration in the balancing columns. A combination of flat bars and penetrations in the balancing columns would also be possible.

The volume occupied by the gas bubble depends on the width of the air pipe, and the height and layout of the barriers. This height is usually between one hundredth and one half of the height of the useful part of the air pipe conveying the powder solid. If this height is less than one hundredth of the height of the useful part of the air duct, it is difficult for the gas to flow freely and the bubble is not efficient. If this height is greater than half the height of the useful part of the air pipe, circulation of the powder product is limited and the height of the air pipe is unnecessarily increased for the same flow of conveyed product. For example, the ideal height of the bubble is 50 mm for a conventional air pipe.

The layout of barriers depends on the total length of the air pipe and the number of balancing columns. In general, at least one barrier is necessary associated with each balancing column. However, this system can operate if the number of barriers is less than the number of balancing columns. Each bubble is therefore preferably associated with at least one balancing column.

The bubble is then delimited in space by the top wall of the upper duct in the air pipe, the steel flats forming a barrier and/or penetration of at least one balancing column. The other boundary is the upper level of powder material. Above the upper boundary all walls are fixed, so that the bubble can remain in place in the long term, in other words can stabilize and its position can be fixed within perfectly defined limits. This avoids any risk of a sudden displacement of the bubble that could cause either an unwanted flow or collapsing of the powder material within the air pipe, or a local blockage due to the cross-section of the upper duct of the air pipe being completely filled with powder material.

The bubble is subjected to a pressure directly related to the height of the powder material filling the associated balancing column. If the number of barriers is less than the number of balancing columns, the bubble is associated with several columns filled with an approximately equal height of powder material.

If the volume and pressure of the bubbles are controlled locally, the fluidization pressure can be regulated at all points in the air pipe.

When the bubble has been created, the height of alumina in the balancing column can be regulated, the relation between the bubble pressure and alumina height being given by the formula $$p_b = h * d$$

where h=height of alumina in the balancing column
d=average apparent density of the alumina.

The fluidization pressure $p_f$ is the pressure in the lower duct in the air pipe and enables potential fluidization of the powder material in the upper duct. The bubble pressure is related to the fluidization pressure by the following simplified formula:

$$p_f = \Delta P_p + h_i * d + p_b$$

where $\Delta P_p$=pressure loss in the porous wall
$h_1$=height of alumina in the air pipe.

$\Delta P_p$ remains practically constant, since it depends only on the thickness of the porous wall and the gas velocity. Therefore, all that is necessary is to regulate the fluidization pressure by a servocontrol based on the measurement of the bubble pressure to maintain the height of alumina in the balancing column at a controlled level to give a predefined set value.

This regulation can be adjusted in practice by the use of a pressure transmitter and a manometer measuring the bubble pressure, to which an automatic valve regulating the fluidization pressure is servocontrolled.

Thus, controlling the bubble pressure also controls the fluidization pressure at an optimum value to keep the system in a potential fluidization state. This thus prevents any excess gas in the system and consequently the energy consumption necessary for fluidization can be minimized.

In practice, the objective is always to maintain a slightly positive bubble pressure so as to minimize the gas quantity introduced while maintaining a sufficient height of alumina in the balancing column. Typically, a constant bubble pressure is maintained between 1 and 500 mbars and preferably between 5 and 50 mbars.

The bubble pressure may be measured at any point in the air pipe, but it is preferable to make this measurement at the end of the air pipe since in this way it can be checked that the air pipe is full of powder material to be conveyed. All that is necessary is to check that the system is working correctly and that all areas to be supplied are actually supplied, is simply to check that the bubble pressure is positive at this location.

When the bubble pressure is regulated as described above, it is found that:
  the alumina level is constant in the balancing columns,
  the blow off of solid particles due to the low gas flow necessary for regulated fluidization is low, or even zero,
  lack of segregation in size grading along the air pipe,
  a regular powder flow. The air pipe is kept full of material at all times, thus avoiding any risk of a supply failure,
  minimum energy consumption for all fluidization gas production machines.

BRIEF DESCRIPTION OF THE DRAWINGS

The process according to the invention will be better understood after reading the detailed description of a conveyance device using a horizontal air pipe controlled by bubble pressure in a hyperdense system used to supply modern aluminum electrolysis vats. This device is presented here as a non-restrictive example.

DESCRIPTION OF PREFERRED EMBODIMENTS

Figure 1:
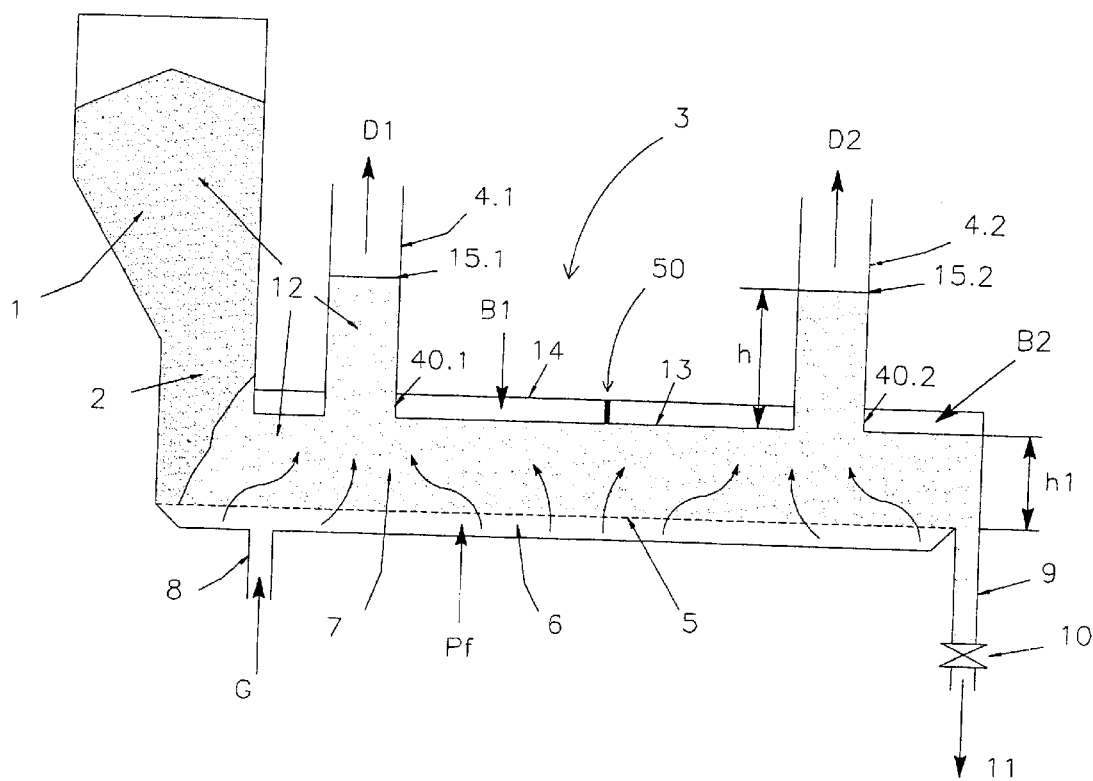
FIG. 1 shows a diagrammatic vertical section through the device according to the invention, with the air pipe shown as being horizontal, symbolizing a portion of the primary conveyor or the secondary conveyor connecting the storage system to a means of removal and comprising a steel flat forming a barrier and separating two bubbles each associated with a balancing column.

The device in FIG. 1 consists of an above ground storage tank 1 containing the material to be conveyed, connected through a pipe 2 to an air pipe or fluidization air cushion type conveyor 3, balancing columns 41 and 42, a means of removal 9 from the conveyor which entrains the powder material towards the area to be supplied 11, using a controlled proportioning system 10.

The above ground storage tank 1 contains bulk powder material 12, at atmospheric pressure. This tank applies pressure to one end of the horizontal (or inclined) conveyor 3 through pipe 2. The longitudinal conveyor 3 consists of a porous wall 5 separating the lower duct 6 and the upper duct 7 through which the powder material circulates.

A fluidization gas G is injected through a pipe 8 into the lower duct 6, where the fluidization pressure $p_f$ is applied to it. This gas passes through the porous wall 5, also called a fabric, and then passes through the powder material that fills the upper duct 7 of the conveyor. The gas is eliminated at low flow (D1, D2) passing through the powder material that partially fills balancing columns 4.1 and 4.2 to levels 15.1 and 15.2, at a manometric head h that balances the gas pressure $p_f$.

The barrier is connected through a steel flat 50 separating the upper part of the upper duct 7 into two parts, thus forming two bubbles B1 and B2. The volume of these bubbles is perfectly delimited in space by the wall of the upper part 14 of the upper duct 7, the steel flat 50, the penetrations 40.1 and 40.2 of the balancing columns 4.1 and 4.2 and the upper level 13 of the powder material 12.

FIG. 1 shows how the fluidization gas G circulates, passing through the fabric 6 and then being directed towards the balancing columns 4.1 and 4.2 on each side of barrier 50. Note that FIG. 1 illustrates two balancing columns associated with one barrier, but it is obvious that the number of columns and barriers will be greater for longer air pipes.

The air pipe is fitted with a discharge means 9 which transforms the horizontal movement of the powder material into a vertical or steeply inclined movement, in order to supply either a secondary conveyor if the air pipe is a primary conveyor, or a hopper integrated into the structure of an electrolysis vat if the air pipe is a secondary conveyor. Hoppers are equipped with controlled proportioning systems 10 at their lower end in order to introduce the required quantities of alumina into the vat.

The present example has a 400 m long horizontal air pipe as the primary conveyor. It is supplied with alumina from a storage silo at its mid-point. 72 pots are supplied by the air pipe; there are 72 secondary conveyors that supply hoppers integrated into the superstructure of each of the 72 pots. The primary conveyor is equipped with 36 balancing columns and the same number of barriers.

The bubble pressure measured at the end of the air pipe is 10 mbars. It is held constant by adjusting the fluidization pressure.

Figure 2:
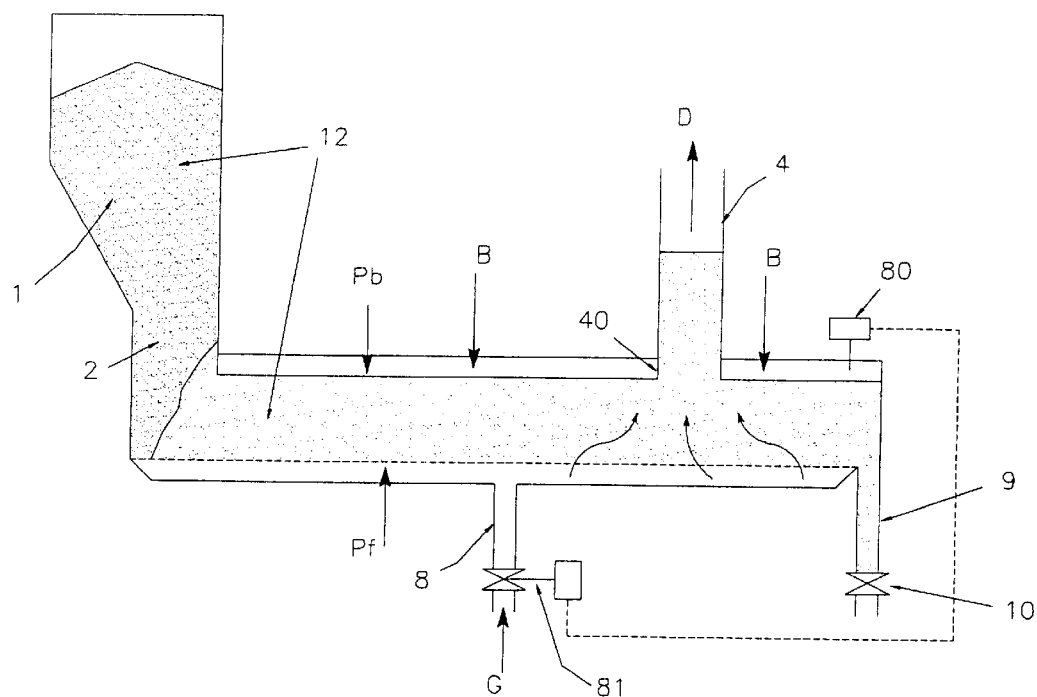
FIG. 2 contains a principle diagram showing how the fluidization pressure is regulated, made using a pressure transmitter and a manometer measuring the bubble pressure, to which an automatic fluidization pressure regulation valve is servocontrolled.

FIG. 2 shows how the fluidization pressure $p_f$ can be regulated by measuring the bubble pressure $pb$ in the bubble B to keep the level controlled and equal to the required set height h of alumina in the balancing column 4.

This regulation is achieved by using a pressure transmitter 80 associated with a manometer measuring the bubble pressure $p_b$ to which an automatic regulation valve 81 regulating the fluidization pressure $p_f$ is servocontrolled, to control the arrival of fluidization gas G through pipe 8.

Thus, controlling the bubble pressure $p_b$ can adjust the fluidization pressure $p_f$ to an optimum value in order to maintain the system in a potential fluidization state.

The bubble pressure may be measured at any point in the air pipe, but it is preferable to measure it at the end of the air pipe since it is thus assured that the air pipe is full of alumina. A simple indication that the bubble pressure is positive at this location confirms that the system is operating correctly and that all vats are supplied.

Figure 3:
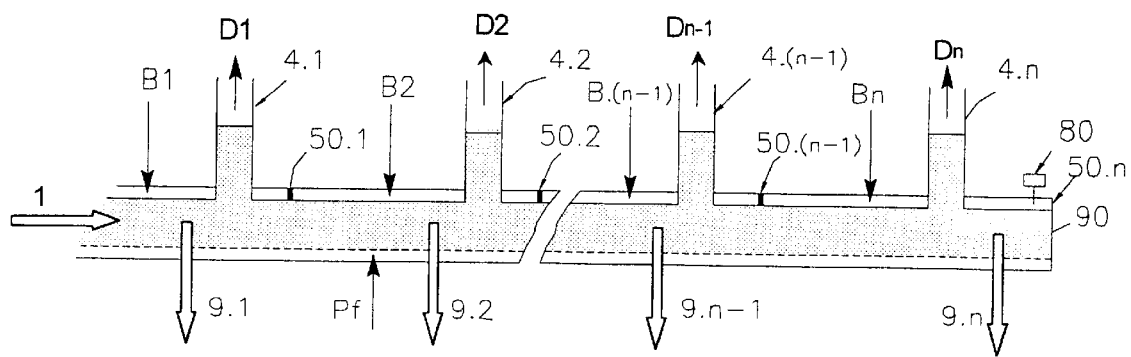
FIG. 3 shows a diagram illustrating the example given below with a particular layout of balancing columns and barriers.

The diagram in FIG. 3 shows the layout of balancing columns and barriers necessary to create the bubble pressure for a preferred operation of the system in hyperdense phase in the case of an installation with 2 n electrolysis pots and n balancing columns. The number n is equal to 36 in the chosen example.

The steel flat 50.1 separates bubbles B1 and B2. It is located slightly on the downstream side of column 4.1. Bubble B1 is associated with discharge means 9.1 symbolizing two secondary conveyors each supplying one vat. Similarly, steel flat 50.(n−1) separates bubbles $B_{n-1}$ and $B_n$. It is located slightly downstream from the balancing column 4.(n−1). Bubble $B_n$ is associated with discharge means 9.n symbolizing two conveyors feeding vats of order 2 n-1 and 2 n respectively. Barrier 50.n is actually coincident with the end wall 90 of the conveyor located on the downstream side of the last balancing column 4.n. The pressure transmitter 80 is located close to end 90 of the air pipe 3; the fluidization pressure regulation $p_f$ is based on a measurement made on the bubble $B_n$ located at the end of the air pipe, in other words which is likely to be at the lowest pressure.

Advantages of the process according to the invention constant level of alumina in balancing columns, little or no blow off of solid particles due to the low gas flow necessary for regulated fluidization, no segregation of size grading along the air pipe, regular flow, and therefore feed of the powder. This advantage is particularly important for aluminum igneous electrolysis vats, minimum energy consumption for all fluidization gas production machines.

What is claimed is:

1. Process for conveyance of a powder material (12) in a potential fluidization hyperdense bed using a device comprising at least one air pipe (3) comprising a lower duct (5) for circulation of a fluidization gas (G), an upper duct (7) for circulation of the powder material (12), the two ducts being separated by a porous wall (6), at least one pipe (8) supplying gas (G) and a balancing column (4; 4.1; 4.2; 4.n), in which the filling height (h) balances the potential fluidization pressure ($p_f$), characterized in that a bubble (B1; B2; B; Bn) of pressurized gas is created in the upper duct (7) in the air pipe (3) when the fluidization pressure is applied in the said air pipe.

2. Process for conveyance of a powder material (12) in a potential fluidization hyperdense bed according to claim 1, characterized in that the said bubble (B1; B2; B; Bn) remains reliably in the upper part (14) of the upper duct (7) of the said air pipe (3).

3. Process for conveyance of a powder material (12) in a potential fluidization hyperdense bed according to claim 1, characterized in that the said bubble (B1; B2; B; Bn) is created and maintained in the upper part (14) of the upper duct (7) of the said air pipe (3), by placing walls forming a barrier, the pressurization of the said bubble being the result of the fluidization pressure of the said air pipe.

4. Process for conveyance of a powder material (12) in a potential fluidization hyperdense bed according to claim 1, characterized in that the said bubble (B1; B2; B; Bn) of pressurized gas is associated with at least one balancing column (4; 4.1; 4.2; 4.n).

5. Process for conveyance of a powder material (12) in a potential fluidization hyperdense bed according to claim 1, characterized in that the potential fluidization pressure is regulated by servocontrol to the bubble pressure ($p_b$).

6. Process for conveyance of a powder material (12) in a potential fluidization hyperdense bed according to claim 5, characterized in that the bubble pressure ($p_b$) at the end of the air pipe is measured.

7. Process for conveyance of a powder material (12) in a potential fluidization hyperdense bed according to claim 5, characterized in that the bubble pressure ($p_b$) is between 1 and 500 mbars, and preferably between 5 and 50 mbars.

8. Process for conveyance of a powder material (12) in a potential fluidization hyperdense bed according to claim 5, characterized in that a pressure transmitter (80) is used associated with a manometer measuring the bubble pressure ($p_b$) to which an automatic fluidization pressure ($p_f$) regulation valve (81) is servocontrolled, to control the inlet of fluidization gas (G) through pipe (8).

\* \* \* \* \*